United States Patent

[11] 3,608,021

[72] Inventor William E. Ziegler
Ann Arbor, Mich.
[21] Appl. No. 844,490
[22] Filed July 24, 1969
[45] Patented Sept. 21, 1971
[73] Assignee Hoover Ball and Bearing Company
Saline, Mich.

[54] METHOD AND APPARATUS FOR BLOW MOLDING AND TRIMMING PLASTIC ARTICLES
12 Claims, 5 Drawing Figs.

[52] U.S. Cl. ..................................................... 264/98,
18/5 BQ, 18/5 BS, 264/151
[51] Int. Cl. ....................................................... B29c 17/07
[50] Field of Search............................................ 264/94, 98,
99; 18/5 BQ, 5 BS, 5 BA, 5 BE, 5 BM

[56] References Cited
UNITED STATES PATENTS
3,369,272 2/1968 Martin, Jr. et al. ............ 264/98 X Primary Examiner—Robert F. White
Assistant Examiner—T. J. Carvis
Attorney—Olsen and Stephenson ABSTRACT: Blow molding apparatus for forming plastic bottles and jugs in a sectional mold and trimming the neck of the bottle or jug before opening the mold. An extruder head is provided for extruding a molten plastic tube around a blow pin having an enlarged head at its end. The blow pin is axially reciprocable and in its advanced position is located so that the enlarged head is within the cavity of the sectional mold when the latter is closed about the extruded tubing. The sectional mold has a circular shear edge for cooperating with the enlarged head portion when the blow pin is retracted from the closed mold for severing from the blown bottle or jug the portion of the molten plastic material exterior of the cavity. The enlarged head of the blow pin is a ball which is supported on the stem of the blow pin and the stem has flexible properties and is mounted so that the ball will pilot itself through the circular shear edge even though misaligned with the shear edge, thereby permitting the mold to be tilted, if desired, relative to the extrusion orifice so that optimum placement of the plastic material within the mold can be realized.

A method is disclosed comprising the steps of positioning a parison of molten plastic material about a ball, closing a sectional mold about the parison and ball, blowing the parison so that it conforms to the mold cavity, and removing the ball from the mold by a piloting action so that the ball in cooperation with the mold sections will trim the internal diameter of the opening in the blown article.

INVENTOR
WILLIAM E. ZIEGLER

INVENTOR
WILLIAM E. ZIEGLER
BY
Olsen and Stephenson
ATTORNEYS

3,608,021

METHOD AND APPARATUS FOR BLOW MOLDING AND TRIMMING PLASTIC ARTICLES

BACKGROUND OF THE INVENTION

The present invention relates to blow molding apparatus for blowing hollow articles from molten plastic material and concurrently with the blowing operation trimming the neck of the blown article while still in the mold.

It is known to provide apparatus of this general character for concurrently blow molding and trimming plastic articles, such as is shown in U.S. Pat. No. 3,369,272, granted Feb. 20, 1968 to Martin, Jr. et al.

SUMMARY OF THE INVENTION

The present invention is particularly directed to improvements in apparatus of the type shown in the aforesaid U.S. Pat. No 3,369,272, so as to provide superior operating conditions for the blow molding apparatus, reduce tooling costs, provide longer life for the tooling used with the apparatus, produce superior finished products, and the like.

When forming bottles whose necks are trimmed in the manner disclosed in Pat. No. 3,369,272, it is desirable that the inner lip of the container be free of fuzz, which may be present if the tolerances between the enlarged head on the blow pin and the shear ring or edge of the mold sections are excessive. The tolerances vary because of temperature conditions that occur during production runs, resulting in one of the interfitting parts being heated or cooled more or less than the other part. Thus, when temperature differences occur, it is necessary that the tolerances provided between the head and the shear ring or edge be adequate to permit movement of the head through the shear ring during the most adverse temperature conditions. Under these circumstances, when the temperature conditions are more favorable so that the dimensional characteristics of the head and the shear ring are less distorted, the tolerance between the parts may be too great, and then when the trimming operation occurs some of the material from the neck of the bottle will be wiped between the ring and the head, and will not be trimmed from the top surface of the bottle, thereby creating a small amount of fuzz which subsequently must be removed before the bottle can be sold to the consumer.

It has also been found that the cost for making shear rings and enlarged heads for apparatus of the type shown in Pat. No. 3,369,272 is relatively high, because each pair of mating parts must be individually manufactured. Also, the life of the shear ring is not as great as is desired, because the land against which the enlarged head travels is necessarily made to a minimum dimension so as to minimize heat transfer between the parts.

The present invention has overcome these and other problems by providing land on the shear ring which has a relatively long longitudinal dimension and an enlarged head for the blow pin which is made from a conventional metal ball. As is well known to those skilled in the art, metal balls are made as standard items in a very large variety of sizes so that such balls can readily be used for the enlarged head merely by forming a bore through the ball and mounting the ball on the end of the blow pin. By virtue of this construction, only a line contact will be made with the shear ring so that minimum heat transfer occurs between the ball and the molten plastic material that is sheared between the shear ring and the ball.

Another problem which arises when using all types of blow molding apparatus for forming a variety of containers, such as jugs having hollow handles, is that the parison that is extruded must necessarily have a dimension such that when the molds are closed the parison will be of a sufficient dimension to occupy all portions of the cavity within which the article is to be blown. Thus, when a container such as a jug having a hollow handle is blow molded, it is necessary that the parison have a sufficient diameter so as to overlap the hollow handle portion of the mold so that during the blowing operation the handle will be formed. As is known to those skilled in the art, problems increase during the blow molding operations in proportion to the added diameter of the extruded parison. Therefore, it is desirable when blow molding to maintain the parison as small in diameter as is possible while still forming the product that is desired.

In the past, it has always been conventional practice to align the mold with the extrusion orifice, and one of the features of the present invention is that it permits the mold to be tilted relative to the extrusion orifice and the trimming operation of the neck can still be performed satisfactorily. By virtue of the construction and arrangement of a ball or spherical-shaped head on the end of the blow pin, it is found that the ball is self-piloting through the shear ring so that the mold can be tilted at an angle to permit use of a parison of smaller dimension to overlap the handle portion of the mold, and the trimming operation can be performed in a very satisfactorily manner, since the ball or spherical-shaped head can readily pass through the shear ring even though the latter is in a plane inclined to the axis of movement of the blow pin. To facilitate piloting of the enlarged head through the shear ring, the stem of the blow pin is spaced from the axial bore of the extrusion head through which the blow pin normally extends, and the blow pin is of sufficiently resilient material so that it can deflect to accommodate any misalignment or tilting of the mold relative to the blow pin.

The present invention is described with respect to an extrusion head having a blow pin extending downwardly through a central bore, and the spherical head is mounted on the end of the reciprocable blow pin. However, it is to be understood that the blow pin can also be mounted at a location remote from the extrusion head, but so that a parison can be positioned thereover prior to closing the mold sections, such as occurs, for example, when using a bottom blow pin in blow molding apparatus. Similarly, a mandrel, other than a blow pin, can be used for the trimming operation and a separate air injection means can be used, such as a hollow needle or the like.

According to a preferred form of the invention, blow molding apparatus is provided having an extrusion head having an annular orifice for forming a tubular parison of plastic material, mold sections are mounted adjacent to the extrusion orifice and form when closed a cavity terminating at one end in an annular wall defining around its inner periphery a shear edge or ring. The mold sections are movable between open and closed positions for enclosing the extruded parison. A reciprocable blow pin having a stem with an enlarged spherical-shaped head or ball at its distal end is provided, said blow pin being mounted so that its end is adapted to be enclosed by an extruded parison and for movement between an advanced positions with the spherical-shaped head located in the cavity axially inward of the shear edge and a retracted position removed from the cavity. Means are provided for introducing air through the blow pin into the parison when the blow pin is in its advanced position and the molds are closed. The shear edge or ring and the ball or spherical-shaped head have close fitting tolerances so that when the blow pin is moved to its retracted position the plastic material at the edge or ring will be sheared from the plastic material within the cavity.

In a preferred embodiment of the method, a parison of molten plastic material is extruded over the end of a blow pin having an enlarged spherical-shaped head for trimming the internal diameter of an opening in the article, a sectional mold is closed about the parison and the end of the pin, air under pressure is introduced into the parison to cause the parison to conform to the shape of the mold cavity, and the pin is then removed from the mold by a self-piloting action so that the spherical head functions to trim the internal diameter of the opening of the article as the head passes out of the cavity. This same method of operation can be performed irrespective of whether the mold cavity is aligned with the extrusion orifice or is tilted at an angle with respect thereto.

Accordingly, it is an object of the present invention to provide improved apparatus for blow molding and trimming containers having an aperture or neck therein, and it is a further object of the present invention to provide an improved method of forming such articles.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENTS

Figure 1:
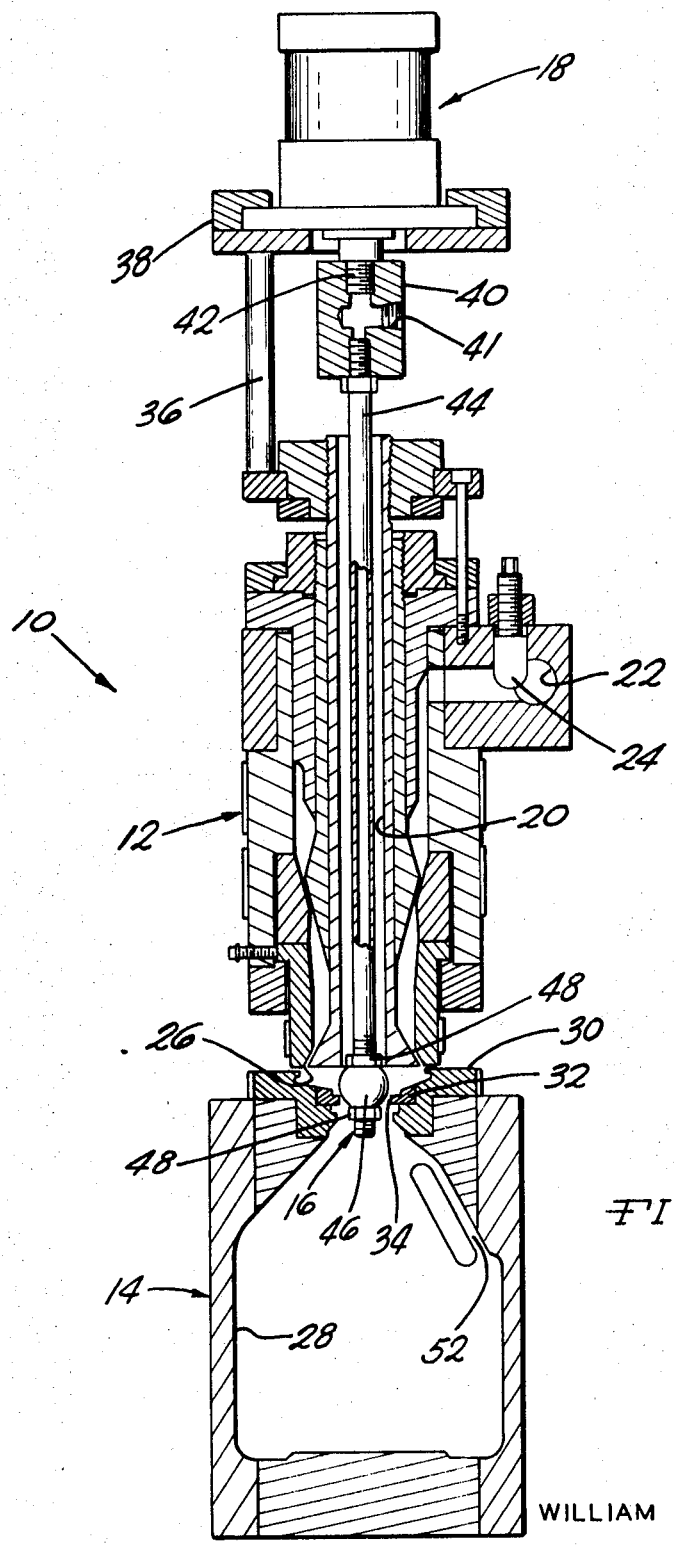
FIG. 1 is a vertical sectional view through blow molding apparatus embodying one form of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The blow molding apparatus 10 includes an extrusion head 12, a sectional mold 14, a blow pin 16, and an air cylinder assembly 18 for moving the blow pin 16 between advanced and retracted positions.

The extrusion head 12 of a conventional type except that it may have an enlarged bore 20 through which the blow pin 16 extends for a purpose to be described.

An inlet 22 is provided for supplying molten organic plastic material from an extruder, not shown, and a balancing orifice is provided by the adjustable element 24 for use when multiple extrusion heads are used in connection with the extruder. The molten plastic material is discharged from the annular extrusion orifice 26. Mounted below the extrusion orifice 26 is a sectional mold 14, only one section of which is shown which defines a cavity 28 for forming a jug having a hollow handle. The mold section 14 includes the neck ring 30 in which is fitted a shear inert 32 which defines an annular wall having around its inner periphery a shear edge 34.

Mounted on the upper end of the extrusion head 12 by means of a plurality of posts 36, only one of which is shown, is the air cylinder 18 which is secured in place by the cylinder clamps 38. An air connector 40 having an inlet 41 for receiving air under pressure is connected to the rod 42 of the air cylinder 18, and the stem 44 of the blow pin 16 is also secured to the air connector so that the air cylinder can move the blow pin 16 between its retracted position shown in FIG. 1, and an advanced position wherein the ball 46 mounted on the distal end of the stem 44 is positioned within the cavity 28 axially inward of the shear edge 34.

The ball 46 can be manufactured to any desired size in the manner that is conventionally employed when making the balls for ball bearings, and a bore can then be introduced diametrically through the ball after which the ball or spherical-shaped element can be fitted on the end of the stem 34 and secured in the desired axial position by means of a pair of threaded nuts 48. By virtue of the length of the stem 44 and the relatively large dimension of the bore 20 in the extruder head 12, the ball or spherical-shaped head 46 can readily pilot itself into the circular shear edge 34 and if necessary, the resilient characteristics of the stem 44 will permit the ball 46 to be laterally displaced to facilitate passing the ball or spherical-shaped head 46 through the circular opening defined by the shear edge 34. Thus, at all times when the ball element 46 is passing through the circular shear edge 34, only a line contact will exist between the ball 46 and the shear edge 34. Thus, minimum heat transfer will occur between these parts and it also will be possible for the land which forms the inner periphery of the circular shear edge to have a relatively long axial dimension thereby assuring greater length of life of the shear insert 32. Also, the ball or spherical-shaped head 46 can readily be replaced with a similar element of a proper dimension, should wear between these mating parts become excessive. As is well known, it is conventional practice to make steel balls in a vast number of sizes, differing by as little as one thousandth of an inch in diameter. Thus, replacement parts can readily be acquired at relatively nominal costs.

Figure 2:
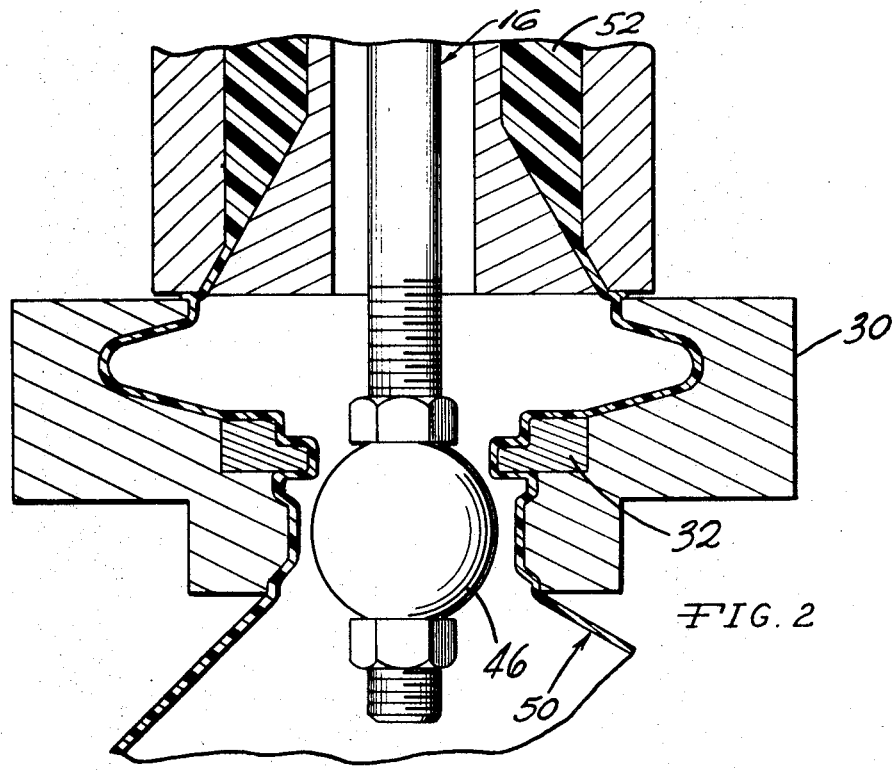
FIG. 2 is an enlarged fragmentary sectional view, showing the apparatus in one position of operation.
Figure 3:
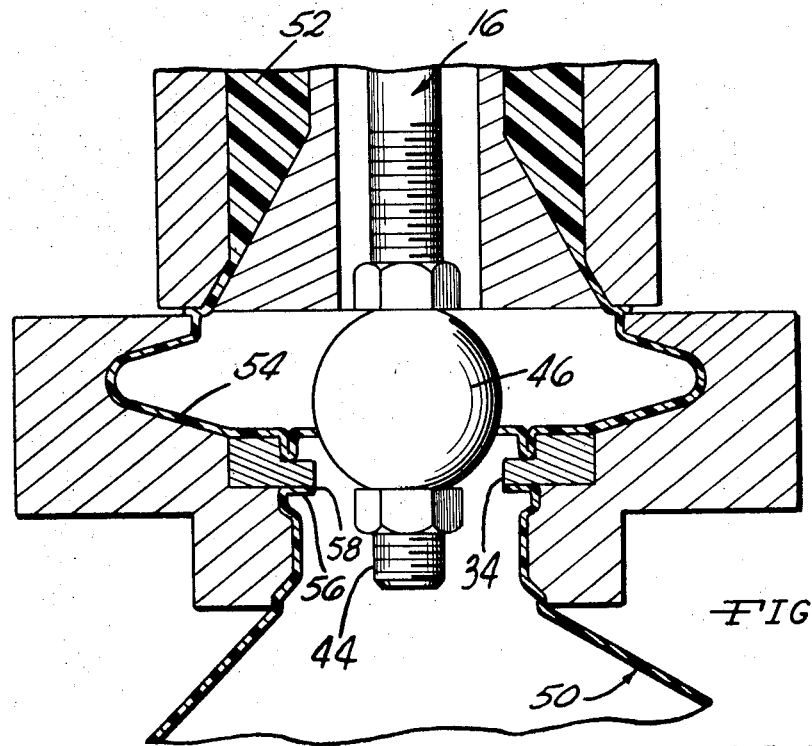
FIG. 3 is a fragmentary sectional view similar to that of FIG. 2, showing the apparatus in another position of operation.

Referring now to FIGS. 2 and 3, the operation of one embodiment of the invention will be described. As shown in FIG. 2, the blow pin 16 is in its advanced position with the spherical-shaped head 46 positioned within the mold cavity and an unfinished container 50 is shown to have been blown to the configuration of the cavity. At this stage of the operation, the molten plastic material 52 is still connected to the container 50.

Subsequent to blowing of the container 50 the blow pin 16 is returned to its retracted position shown in FIG. 3, and this step of operation has resulted in trimming the waste material in the dome 54 from the top wall 56 of the container 50. This trimming operation has assured that a clean shearing action has occurred around the inner periphery 58 of the container so that there is no fuzz remaining at this inner lip.

In the normal operation of the blow molding apparatus a parison is initially extruded between open mold sections 14 with the blow pin 16 in its advanced position, after which the mold sections are then closed. Air in introduced through the blow pin 16 so as to blow the container 50 to the configuration illustrated in FIG. 2. The blown container is held under air pressure for an adequate cooling period, after which the blow pin is moved to its retracted position shown in FIG. 3, thereby passing through the circular shear edge 34 to finish the inner diameter of the neck at 58. The blow air is then exhausted, and the mold sections are opened, after which the bottle is ejected. The blow pin 16 is then moved again to its advanced position and the cycle is repeated.

One of the significant features of the present invention is the manner in which the spherical-shaped head 46 will pilot itself through the circular shear ring 34. This feature eliminates many of the problems of properly adjusting the position of the blow pin 16 relative to the mold 14. Also, the axial setting of the ball 46 on the stem 44 is not critical.

Figure 4:
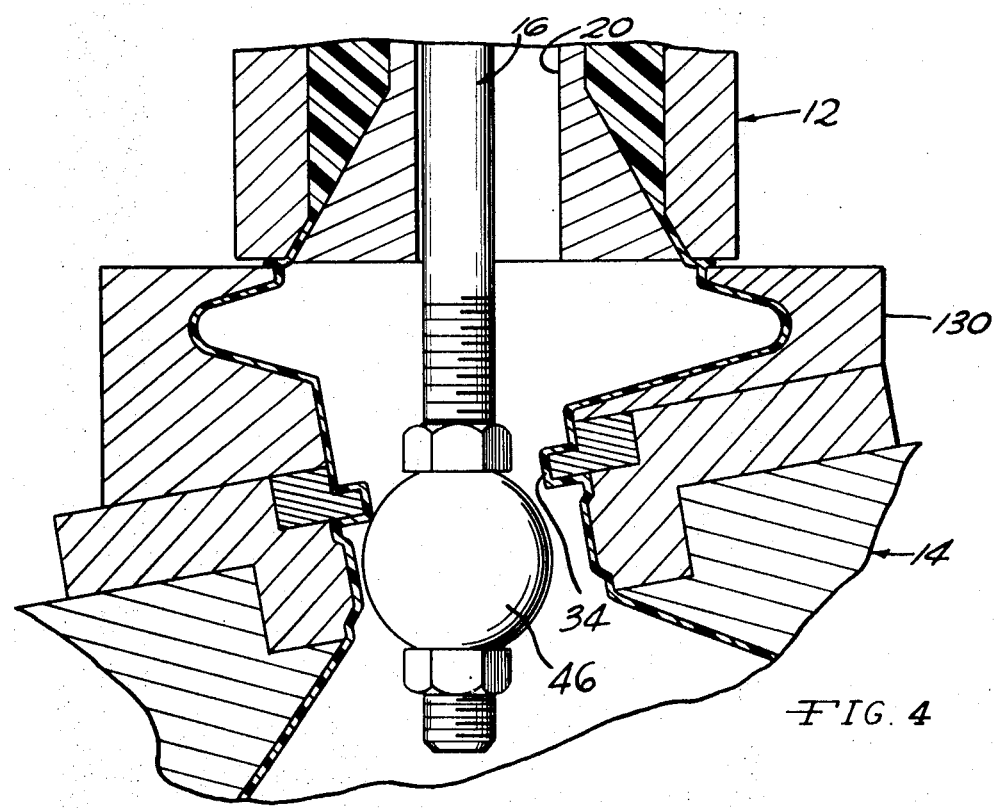
FIG. 4 is an enlarged fragmentary sectional view similar to that of FIG. 2, but showing a modified form of the invention in one position of operation.
Figure 5:
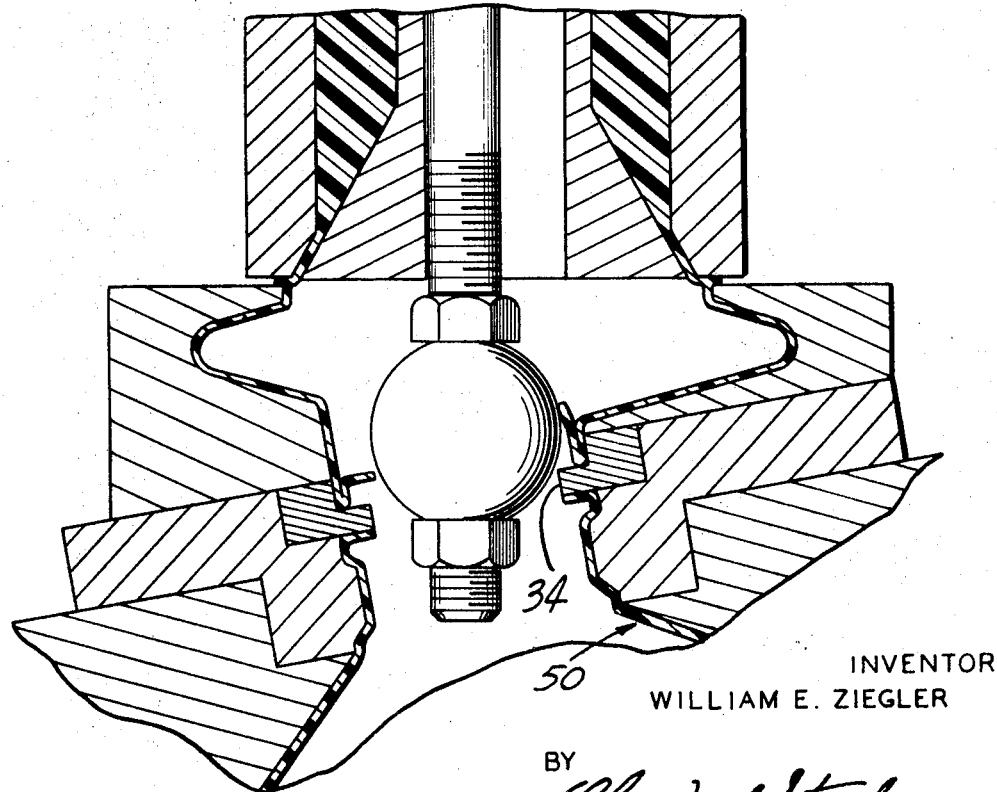
FIG. 5 is an enlarged fragmentary section of the embodiment shown in FIG. 4, showing the apparatus in another position of operation.

Referring to FIGS. 4 and 5, it can readily be seen that the use of a modified neck ring 130 will permit the sectional mold 14 to be tilted relative to the extrusion head 12 in which position the plane extending through the circular shear edge 34 will be inclined relative to the axis of the blow pin 16. Even though the circular edge is tilted in this manner, the spherical-shaped head 46 will initially engage the circular shear edge at its lowermost extremity and will then pilot itself into the opening defined by this shear edge and the spherical-shaped head will then pass through the opening to shear the waste material from the upper edge of the neck of the container 50 in essentially the same manner as was described with respect to the embodiment shown in FIGS. 2 and 3. It is to be noted that the blow pin 16 is displaced from the center of the bore 20 of the extruder head 12, it being one of the advantages of the present invention that the blow pin can be offset in this manner without any harmful effect in the trimming operation that is to take place. Thus, it is not critical that the blow pin 16 be precisely mounted relatively to the extrusion head 12 on the mold 14.

Another of the significant features of the present invention is the construction and arrangement of the spherical-shaped head 46 and the circular shear edge 34 which permits the sectional mold 14 to be tilted relative to the axis of the extrusion orifice 26. As was indicated previously, one of the problems that is faced by the molding of jugs having hollow handles is the need to extrude a parison of sufficient width to be enclosed in the portion 52 of the mold cavity 28 so that when the bottle is blown the handle for the jug will be inflated. By virtue of the arrangement shown in FIGS. 4 and 5, a mold for blowing jugs can be tilted to the positions shown wherein the handle portion of the jug will be displaced inwardly toward the axis of the extruded parison thereby permitting the molder to use a parison having a smaller diameter. As is known to those skilled in the art, this is a significant improvement because the problems associated with blow molding molten plastic material are materially reduced when a parison of smaller diameter can be used to form a hollow container.

The steps of operation of the embodiment illustrated in FIGS. 4 and 5 are essentially the same as those set forth with respect to the embodiment shown in FIGS. 2 and 3, and therefore, they will not be repeated.

It is claimed:

1. In blow molding apparatus, mold sections forming when closed a cavity terminating at one end in an annular wall defining around its inner periphery a circular shear edge, said mold sections being movable between open and closed positions, a reciprocable pin having a stem with an enlarged spherical-shaped head at its distal end, said pin being mounted with its stem in general alignment with the center of the circular shear edge for movement between an advanced position with said spherical-shaped head located within said cavity axially inward of said shear edge and a retracted position removed from said cavity, said shear edge and said head having close-fitting tolerances, and means for moving said pin between said advanced position and said retracted position.

2. In blow molding apparatus, the combination as is defined in claim 1, wherein said spherical-shaped head is supported by said stem so as to be laterally displaceable relative to said shear edge.

3. In blow molding apparatus, the combination as is defined in claim 1, wherein said stem has resilient properties to permit lateral displacement of said head relative to said shear edge.

4. In blow molding apparatus, the combination as is defined in claim 1, wherein said spherical-shaped head is a ball having a diametral bore through which the distal end of the stem extends.

5. In blow molding apparatus, the combination as is defined in claim 1, wherein said cavity has an axis passing through the center of said circular shear edge and said circular shear edge is in a plane perpendicular to said axis.

6. In blow molding apparatus, the combination as is defined in claim 5, wherein the axis of said cavity coincides with the axis of said pin.

7. In blow molding apparatus, the combination as is defined in claim 4, wherein the axis of said cavity is inclined to the axis of said pin.

8. In blow molding apparatus, the combination as is defined in claim 7, wherein the axis of said cavity and the axis of said pin intersect in said plane.

9. In blow molding apparatus, an extrusion head having an annular orifice for forming a tubular parison of plastic material, mold sections mounted adjacent to said extrusion orifice and forming when closed a cavity terminating at one end in an annular wall defining around its inner periphery a shear edge, said mold sections being movable between open and closed positions for enclosing an extruded parison, a reciprocable blow pin having a stem with an enlarged spherical-shaped head at its distal end, said blow pin being mounted so that its end is adapted to be enclosed by an extruded parison and for movement between an advanced position with said spherical-shaped head located within said cavity axially inward of said shear edge and a retracted position removed from said cavity, means for introducing fluid through said blow pin into said parison when said blow pin is in its advanced position and said mold sections are closed, said shear edge and said head having close fitting tolerances so that when said blow pin is moved to its retracted position the plastic material at said edge will be sheared from the plastic material within said cavity, and means for moving said blow pin between said advanced position and said retracted position.

10. In blow molding apparatus, the combination as is defined in claim 9, wherein said extrusion head has an axial bore through which said blow pin extends in spaced relation to the extrusion head.

11. In blow molding apparatus, the combination as is defined in claim 10, wherein the axis of the circle defined by said shear edge is inclined to the axis of said stem.

12. A method of forming and trimming an article from plastic material comprising extruding a tubular parison of molten plastic material over the end of a blow pin having en enlarged spherical head, closing about the parison and the one end of the blow pin a tilted sectional mold which has a cavity defining the article to be blown and which has a circular shear edge at one end of the cavity perpendicular to and concentric with the longitudinal axis of the cavity and encircling the parison and the blow pin, said mold being tilted when closed so that the longitudinal axis of the mold is inclined to and intersects the axis of extrusion of the parison substantially at the center of said circular shear edge, introducing a pressurized fluid into the parison to cause the parison to conform to the shape of the cavity, and removing the blow pin from the mold along the axis of extrusion of the parison while allowing the spherical head to engage the circular shear edge and to pilot itself through said circular shear edge thereby trimming from the blown article the material outside said cavity.